United States Patent
Kumar et al.

(10) Patent No.: US 10,657,580 B2
(45) Date of Patent: May 19, 2020

(54) SYSTEM FOR IMPROVING IN-STORE PICKING PERFORMANCE AND EXPERIENCE BY OPTIMIZING TOTE-FILL AND ORDER BATCHING OF ITEMS IN RETAIL STORE AND METHOD OF USING SAME

(71) Applicant: Wal-Mart Stores, Inc., Bentonville, AR (US)

(72) Inventors: Ashwin Kumar, Bangalore (IN); Ameya Ajay Shendre, Bangalore (IN); Pratosh Deepak Rajkhowa, Bangalore (IN)

(73) Assignee: WALMART APOLLO, LLC, Bentonville, AR (US)

( * ) Notice: Subject to any disclaimer, the term of this patent is extended or adjusted under 35 U.S.C. 154(b) by 537 days.

(21) Appl. No.: 15/417,929

(22) Filed: Jan. 27, 2017

(65) Prior Publication Data

US 2018/0218440 A1   Aug. 2, 2018

(51) Int. Cl.
   *G06Q 30/00* (2012.01)
   *G06Q 30/06* (2012.01)

(52) U.S. Cl.
   CPC .................. *G06Q 30/0635* (2013.01)

(58) Field of Classification Search
   None
   See application file for complete search history.

(56) References Cited

U.S. PATENT DOCUMENTS

| | | | |
|---|---|---|---|
| 5,909,023 A * | 6/1999 | Ono | G06Q 10/087 235/380 |
| 6,123,259 A * | 9/2000 | Ogasawara | G06K 17/0022 235/380 |
| 6,246,998 B1 | 6/2001 | Matsumori | |
| 6,266,649 B1 * | 7/2001 | Linden | G06Q 10/08345 705/14.51 |

(Continued)

FOREIGN PATENT DOCUMENTS

| | | |
|---|---|---|
| CN | 101778045 A | 7/2010 |
| CN | 101964799 A | 2/2011 |

(Continued)

OTHER PUBLICATIONS

Elmahi, I., et al. "A genetic algorithm approach for the batches delivery optimization in a supply chain." IEEE International Conference on Networking, Sensing and Control, 2004. vol. 1. IEEE, 2004. (Year: 2004).*

*Primary Examiner* — Christopher B Seibert
(74) *Attorney, Agent, or Firm* — Bryan Cave Leighton Paisner LLP

(57) ABSTRACT

A system and method includes receiving a plurality of orders having one or more items, separating the orders by load number and due times, batching the separate orders into different commodities, generate optimized rebatched orders according to an optimization algorithm that generates the optimized rebatched orders based on at least one of distance and volume of the items of the one or more items within the batched orders of the different commodities, sorting the one (Continued)

or more items within the rebatched orders by sequence numbers, and transmitting the sorted one or more items to a user device.

20 Claims, 5 Drawing Sheets

(56) References Cited

U.S. PATENT DOCUMENTS

| | | | |
|---|---|---|---|
| 6,317,722 B1* | 11/2001 | Jacobi | G06Q 30/0255 705/14.51 |
| 7,147,154 B2 | 12/2006 | Myers et al. | |
| 7,295,990 B1 | 11/2007 | Braumoeller et al. | |
| 7,747,543 B1 | 6/2010 | Braumoeller et al. | |
| 7,949,686 B2 | 5/2011 | Chang et al. | |
| 8,005,761 B1 | 8/2011 | Braumoeller et al. | |
| 8,121,876 B1 | 2/2012 | Braumoeller et al. | |
| 8,201,737 B1 | 6/2012 | Palacios Durazo et al. | |
| 8,401,914 B1 | 3/2013 | Kim | |
| 8,428,988 B1 | 4/2013 | Braumoeller et al. | |
| 8,452,797 B1* | 5/2013 | Paleja | G06Q 30/02 707/767 |
| 8,818,836 B1 | 8/2014 | Braumoeller et al. | |
| 9,147,208 B1 | 9/2015 | Argue et al. | |
| 9,466,045 B1 | 10/2016 | Kumar | |
| 9,470,532 B2 | 10/2016 | Pellow et al. | |
| 9,626,709 B2 | 4/2017 | Koch et al. | |
| 10,127,514 B2 | 11/2018 | Napoli | |
| 2002/0161664 A1* | 10/2002 | Shaya | G06Q 30/02 705/7.31 |
| 2002/0198756 A1 | 12/2002 | Ghaisas et al. | |
| 2003/0033177 A1 | 2/2003 | MacGonigle et al. | |
| 2003/0177072 A1 | 9/2003 | Bared | |
| 2004/0010437 A1 | 1/2004 | Kiran et al. | |
| 2004/0068443 A1 | 4/2004 | Hopson et al. | |
| 2004/0210621 A1 | 10/2004 | Antonellis | |
| 2005/0278062 A1 | 12/2005 | Janert et al. | |
| 2007/0094067 A1* | 4/2007 | Kumar | G06Q 10/04 705/26.2 |
| 2007/0174144 A1 | 7/2007 | Borders et al. | |
| 2007/0244758 A1 | 10/2007 | Xie | |
| 2007/0250355 A1 | 10/2007 | Leet et al. | |
| 2009/0048878 A1 | 2/2009 | Metcalf | |
| 2009/0157472 A1 | 6/2009 | Burazin et al. | |
| 2009/0281921 A1 | 11/2009 | Foster et al. | |
| 2010/0010902 A1 | 1/2010 | Casey | |
| 2010/0287025 A1 | 11/2010 | Fletcher et al. | |
| 2011/0213651 A1* | 9/2011 | Milana | G06Q 30/02 705/14.25 |
| 2012/0023034 A1 | 1/2012 | Lynch et al. | |
| 2012/0078747 A1* | 3/2012 | Chakrabarti | G06Q 30/0601 705/26.7 |
| 2012/0123674 A1 | 5/2012 | Perks et al. | |
| 2012/0150340 A1 | 6/2012 | Suess et al. | |
| 2012/0330458 A1 | 12/2012 | Weiss | |
| 2013/0030955 A1 | 1/2013 | David | |
| 2013/0185198 A1* | 7/2013 | Lorch | G06O 20/29 705/39 |
| 2013/0231990 A1 | 9/2013 | Munjal et al. | |
| 2013/0332273 A1 | 12/2013 | Gu et al. | |
| 2013/0346204 A1 | 12/2013 | Wissner-Gross et al. | |
| 2014/0003727 A1 | 1/2014 | Lortz et al. | |
| 2014/0040075 A1 | 2/2014 | Perry et al. | |
| 2014/0095350 A1 | 4/2014 | Carr et al. | |
| 2014/0136255 A1 | 5/2014 | Grabovski et al. | |
| 2014/0156553 A1 | 6/2014 | Leach et al. | |
| 2014/0207615 A1 | 7/2014 | Li et al. | |
| 2014/0266616 A1 | 9/2014 | Jones et al. | |
| 2014/0278627 A1* | 9/2014 | Grabovski | G06Q 10/06316 705/7.13 |
| 2014/0279294 A1 | 9/2014 | Field-Darragh | |
| 2014/0324491 A1 | 10/2014 | Banks et al. | |
| 2014/0336814 A1 | 11/2014 | Moore et al. | |
| 2014/0351101 A1* | 11/2014 | Danelski | G06Q 10/087 705/28 |
| 2014/0379529 A1 | 12/2014 | Agasti et al. | |
| 2015/0051994 A1 | 2/2015 | Ward et al. | |
| 2015/0170256 A1 | 6/2015 | Pettyjohn | |
| 2015/0206093 A1 | 7/2015 | Trew et al. | |
| 2015/0242918 A1 | 8/2015 | McCarthy | |
| 2015/0278759 A1 | 10/2015 | Harris et al. | |
| 2015/0310447 A1 | 10/2015 | Shaw | |
| 2016/0012391 A1 | 1/2016 | Burnett | |
| 2016/0055452 A1* | 2/2016 | Qin | G06Q 10/087 705/7.31 |
| 2016/0063604 A1 | 3/2016 | Shaffer et al. | |
| 2016/0071056 A1 | 3/2016 | Ellison et al. | |
| 2016/0092969 A1* | 3/2016 | Gopalsamy | G06Q 30/0635 705/26.81 |
| 2016/0148300 A1* | 5/2016 | Carr | G06Q 30/0633 705/26.8 |
| 2016/0171592 A1 | 6/2016 | Pugh et al. | |
| 2016/0203543 A1 | 7/2016 | Snow | |
| 2016/0223339 A1 | 8/2016 | Pellow et al. | |
| 2016/0247113 A1 | 8/2016 | Rademaker | |
| 2016/0253740 A1 | 9/2016 | Goulart | |
| 2016/0258762 A1 | 9/2016 | Taylor et al. | |
| 2016/0260158 A1* | 9/2016 | High | G06K 9/00208 |
| 2016/0299782 A1 | 10/2016 | Jones et al. | |
| 2016/0314429 A1 | 10/2016 | Gillen et al. | |
| 2016/0321605 A1 | 11/2016 | Maifeld et al. | |
| 2016/0350837 A1 | 12/2016 | Williams et al. | |
| 2017/0024789 A1 | 1/2017 | Frehn et al. | |
| 2017/0069013 A1 | 3/2017 | Castillo | |
| 2017/0200108 A1 | 7/2017 | Au et al. | |
| 2017/0213186 A1 | 7/2017 | Grifoni | |
| 2017/0228701 A1 | 8/2017 | Wosk et al. | |
| 2017/0278047 A1 | 9/2017 | Welty et al. | |
| 2017/0285648 A1 | 10/2017 | Welty et al. | |
| 2017/0369245 A1 | 12/2017 | Suemitsu et al. | |
| 2018/0121992 A1 | 5/2018 | Agarwal et al. | |
| 2018/0137452 A1 | 5/2018 | Khartravath et al. | |
| 2018/0182054 A1 | 6/2018 | Yao et al. | |
| 2018/0314991 A1 | 11/2018 | Grundberg | |
| 2018/0342031 A1 | 11/2018 | Tada et al. | |

FOREIGN PATENT DOCUMENTS

| | | |
|---|---|---|
| CN | 102137100 A | 7/2011 |
| CN | 102377629 A | 3/2012 |
| DE | 102012100354 | 7/2013 |
| WO | 2016119747 A1 | 8/2016 |
| WO | 2016119749 | 8/2016 |

* cited by examiner

US 10,657,580 B2

SYSTEM FOR IMPROVING IN-STORE PICKING PERFORMANCE AND EXPERIENCE BY OPTIMIZING TOTE-FILL AND ORDER BATCHING OF ITEMS IN RETAIL STORE AND METHOD OF USING SAME

BACKGROUND OF THE INVENTION

1. Field of the Invention

The present invention relates generally to in-store fulfillment for retail stores and, more particularly, to a system for improving in-store picking performance and experience by optimizing tote-fill and order batching of items in a retail store and method of using same.

2. Description of the Related Art

In general, order fulfillment may refer to a complete process from point-of-sales inquiry to delivery of an item or product to a customer. In the context of a physical retail store, in-store fulfillment may refer to a process from receiving a customer notification, e.g., ordering an item or product via the Internet, for store pick up or delivery to the customer. This process may require a number of tasks including, for example, locating the item in the store's inventory, moving the item to a point of sales of the retail store, and staffing to ensure there is manpower to consummate the sale when the customer arrives at the retail store.

Current in-store picking involves global integrated fulfillment (GIF) systems that batch orders based on their priority (due time and order placement time) with static constraints such as a maximum number of orders in one pick-walk by staff of the retail store. These batch orders are limited by time of day and are known in advance. The batch orders are separated by load number (e.g., truck) and due times (e.g., 9:00 a.m.) and the separate orders are batched into different commodities or items (e.g., frozen). A staff or "picker" receives a number of batch orders and then walks through the retail store to retrieve the items and fill a tote with the items from the batch orders on a first-come-first-serve basis. However this may involve inefficient use of the picker in walking the retail store to retrieve the items. Further, because of a capacity constraint of a trolley used by the picker (for example, 8 totes/trolley), the picker can pick limited totes per pick-walk using the trolley.

It is, therefore, desirable to provide a new system and method that improves order batching by optimizing tote-fill in a retail store. It is also desirable to provide a new system and method that optimizes batch orders based on their spread or distance across the retail store and volumetric information of the items to fill a tote for a picker in the retail store. It is further desirable to provide a new system and method that optimizes both tote fill and order batching to improve pick rates by a picker in the retail store. Thus, there is a need in the art to provide a system for improving in-store picking performance and experience by optimizing tote-fill and order batching of items in a retail store and method of using same that meets at least one of these desires.

SUMMARY OF THE INVENTION

Accordingly, the present invention provides a system including a computing device configured to provide output to a user device. The computing device is configured to receive a plurality of orders having one or more items, to separate the orders by load number and due times, and to batch the separate orders into different commodities. The computing device is also configured to generate optimized rebatched orders according to an optimization algorithm that generates the optimized rebatched orders based on at least one of distance and volume of the items of the one or more items within the batched orders of the different commodities. The computing device is further configured to sort the one or more items within the rebatched orders by sequence numbers and to transmit the sorted one or more items to the user device.

In addition, the present invention provides a method including the steps of receiving, by a computing device, a plurality of orders having one or more items, separating, by the computing device, the orders by load number and due times, and batching, by the computing device, the separate orders into different commodities. The method also includes the steps of generating, by the computing device, optimized rebatched orders according to an optimization algorithm that generates the optimized rebatched orders based on at least one of distance and volume of the items of the one or more items within the batched orders of the different commodities. The method further includes the steps of sorting, by the computing device, the one or more items within the rebatched orders by sequence numbers and transmitting, by the computing device, the sorted one or more items to the user device.

Further, the present invention provides one or more non-transitory computer-readable storage media, having computer-executable instructions embodied thereon, wherein when executed by at least one processor cause the processor to receive a plurality of orders having one or more items, to separate the orders by load number and due times, and to batch the separate orders into different commodities. The computer-executable instructions, wherein when executed by at least one processor, cause the processor to generate the optimized rebatched orders based on at least one of distance and volume of the items of the one or more items within the batched orders of the different commodities. The computer-executable instructions, wherein when executed by at least one processor, cause the processor to sort the one or more items within the rebatched orders by sequence numbers, and to transmit the sorted one or more items to the user device.

One advantage of the present invention is that a new system and method is provided for improving in-store picking performance and experience by optimizing tote-fill and order batching of items in a retail store of a large retailer. Another advantage of the present invention is that the system and method provides an intelligent method to batch orders based on their spread or distance across the retail store and volumetric information of items involved. Yet another advantage of the present invention is that the system and method includes an unsupervised learning algorithm which solves a multi-objective optimization function, which optimizes both tote fill and order batching, resulting in better pick-rates. Still another advantage of the present invention is that the system and method optimizes on two fronts simultaneously, first on minimizing the distance traveled by the picker to pick the items, and second maximizing the tote-fill. A further advantage of the present invention is that the system and method uses proximate order batching (e.g., orders which are closer to each other would be batched together), ensuring better pick-walk. Yet a further advantage of the present invention is that the system and method solves a Pareto optimization problem to optimize tote fill using item volumetric information as well as final pick-walk distance within the retail store. Still a further advantage of the present invention is that the system and method uses k-means clustering to create high-density pick zones.

Other features and advantages of the present invention will be readily appreciated, as the same becomes better understood, after reading the subsequent description taken in conjunction with the accompanying drawings.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
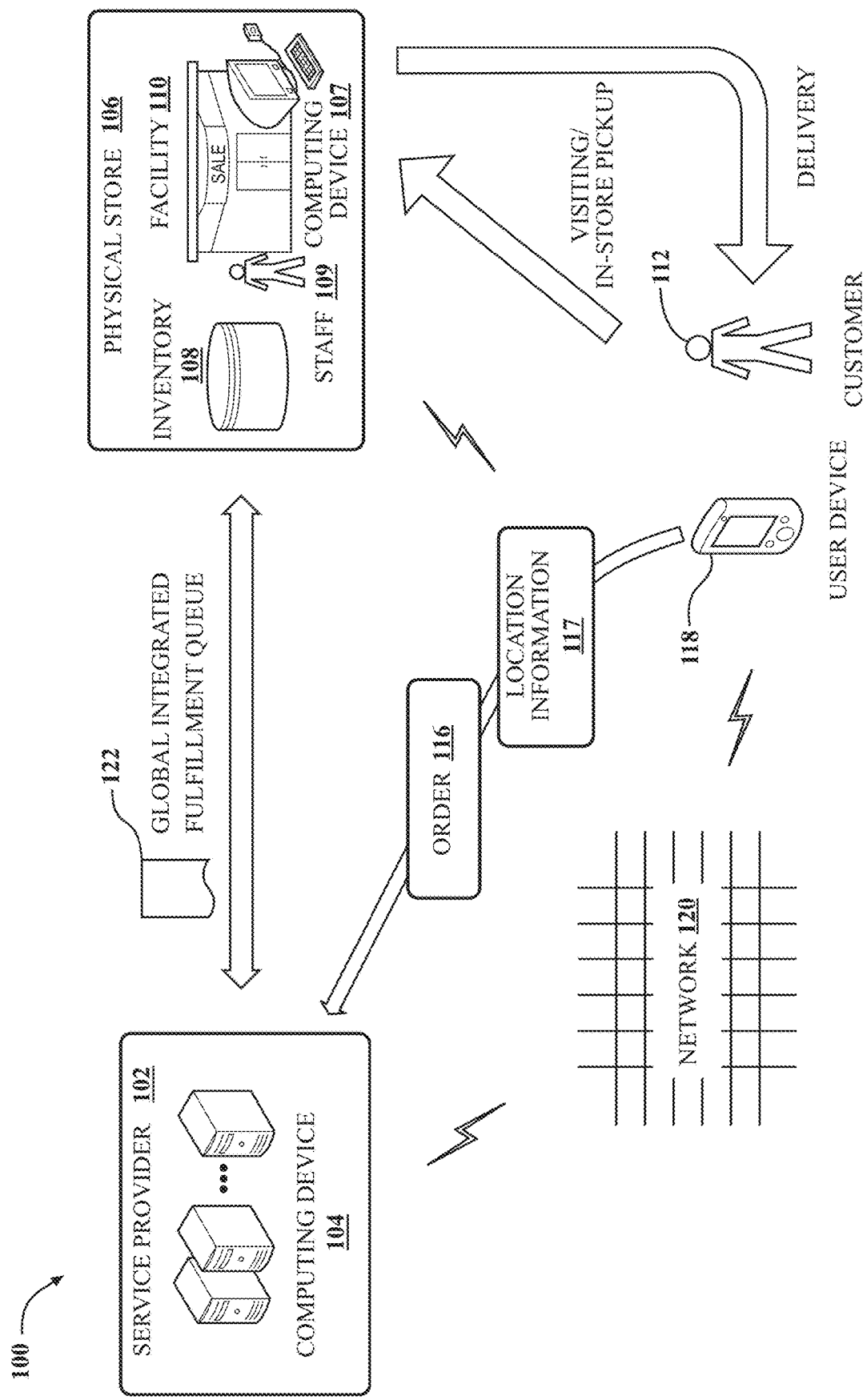
FIG. 1 is a diagrammatic view of a system for improving in-store picking performance and experience by optimizing tote-fill and order batching of items in a retail store, according to one embodiment of the present invention, illustrated in relationship with a retail store.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION OF THE PREFERRED EMBODIMENT(S)

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with".

This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis.

With reference to the FIGS. and in operation, the present invention provides a system 100, method and computer product media that facilitate in-store picking performance and experience by optimizing tote-fill and order batching of items for a retail store. In particular, the present invention improves in-store picking performance and experience by optimizing tote-fill and order batching of items for a picker within the retail store.

For clarity in discussing the various functions of the system 100, multiple computers and/or servers are discussed as performing different functions. These different computers (or servers) may, however, be implemented in multiple different ways such as modules within a single computer, as nodes of a computer system, etc. . . . The functions as performed by the system 100 (or nodes or modules) may be centralized or distributed in any suitable manner across the system 100 and its components, regardless of the location of specific hardware. Furthermore, specific components of the system 100 may be referenced using functional terminology in their names. The function terminology is used solely for purposes of naming convention and to distinguish one element from another in the following discussion. Unless otherwise specified, the name of an element conveys no specific functionality to the element or component.

Referring to FIG. 1, an exemplary environment in which the system 100 for optimizing tote-fill and order batching of items for a retail store is illustrated. In particular, the present invention improves in-store picking performance and experience by optimizing tote-fill and order batching of items for a retail store 106, according to the present invention. The system 100 may be configured for a large retailer having one or more retail stores 106 each having one or more items or products in the retail stores 106. The term "retail store" can include brick-and-mortar stores operated by a single retailer, e.g., supermarket or superstore, or a location that includes stores operated by multiple retailers, e.g., a shopping mall or a shopping plaza.

The system 100 includes a computing device 104, e.g., server, associated with a service provider 102. The service provider 102 may provide a service related to order fulfillment for one or more consumers, such as in-store fulfillment for the retail store 106. For example, the service may include a set of related software and/or hardware functionalities that, together with certain policies set by the service provider 102, enable the retail store 106 to manage an inventory 108 and staff 109 associated with a facility 110 of the retail store 106 in filling in-store fulfillment demands.

In some embodiments, the computing device 104 may receive an order 116 from a first user or customer, such as a user device 118 used by a user or customer 112, for in-store pickup of a first item by the customer 112 at the store, such as the retail store 106, or for delivery of the first item to the customer 112. For example, the customer 112 may install and execute a software application on the user device 118, which may be a smartphone for example, and place the order 116 via such software application. The software application may be provided by the service provider 102. The first item may include one or more items or products and/or one or more services. The order 116 may or may not indicate a planned arrival time of customer 112.

The computing device 104 may also receive location information 117 from the user device 118 of the customer 112. The location information 117 may indicate geographic location of the user device 118 in the form of, for example, global positioning system (GPS) coordinates or a street address. Based on the location information 117, the computing device 104 may determine a location of the customer 112. The computing device 104 may also receive one or more other orders from one or more other customers (not shown) for delivery or in-store pickup at the retail store 106. In other words, there may be plural orders received by the computing device 104 for delivery or in-store pickup at the retail store 106, including the order 116 from the customer 112 and at least one other order from another customer.

In some embodiments, the computing device 104 may receive data and/or information related to the customer 112 from the user device 118 via a network 120. The network 120 enables the computing device 104 to exchange information with the user device 118. The network 120 may include wired and/or wireless networks that enable communications between the various computing devices described in the system 100. In some embodiments, the network 120 may include local area networks (LANs), wide area networks (WAN), mobile telephone networks (MTNs), and other types of networks, possibly used in conjunction with one another, to facilitate communication between the various computing devices (e.g., computing device 104 and user device 118). The user computing device or user device 107, 118 may be a mobile or desktop computer, a personal data assistant (PDA), an internet appliance, an internet enabled mobile phone, a server or any other computing device configured with a network connection.

In some embodiments, the computing device 104 may receive an update of the location of the customer 112 and estimate a revised arrival time of the customer 112 based at least in part on the update of the location of the customer 112. For example, the computing device 104 may continuously or periodically track the location of the customer 112 on his way to the retail store 106 by receiving continuous or periodic location information 117 from the user device 118. The computing device 104 may then re-prioritize the fulfillment of the plural orders for in-store pickup based at least in part on the revised arrival time of the customer 112. It should be appreciated that methods and systems for in-store fulfillment prioritization based on customer location is disclosed in U.S. Patent Application Publication No. 2016/0092969, the entire disclosure of which is expressly incorporated by reference.

In some embodiments, in the fulfillment of the plural orders for in-store pickup or delivery, the computing device 104 may determine a fulfillment queue 122 based at least in part on the number of orders and the due time and order place time. For example, the fulfillment queue may accept one hundred orders placed by 12:00 midnight that are due by 9:00 a.m. the next day. The computing device 104 may transmit the fulfillment queue 122 to a user computing device 107 associated with the retail store 106. It should be appreciated that the fulfillment queue 122 receives batch orders that limited by time of day and are known in advance.

Figure 2:
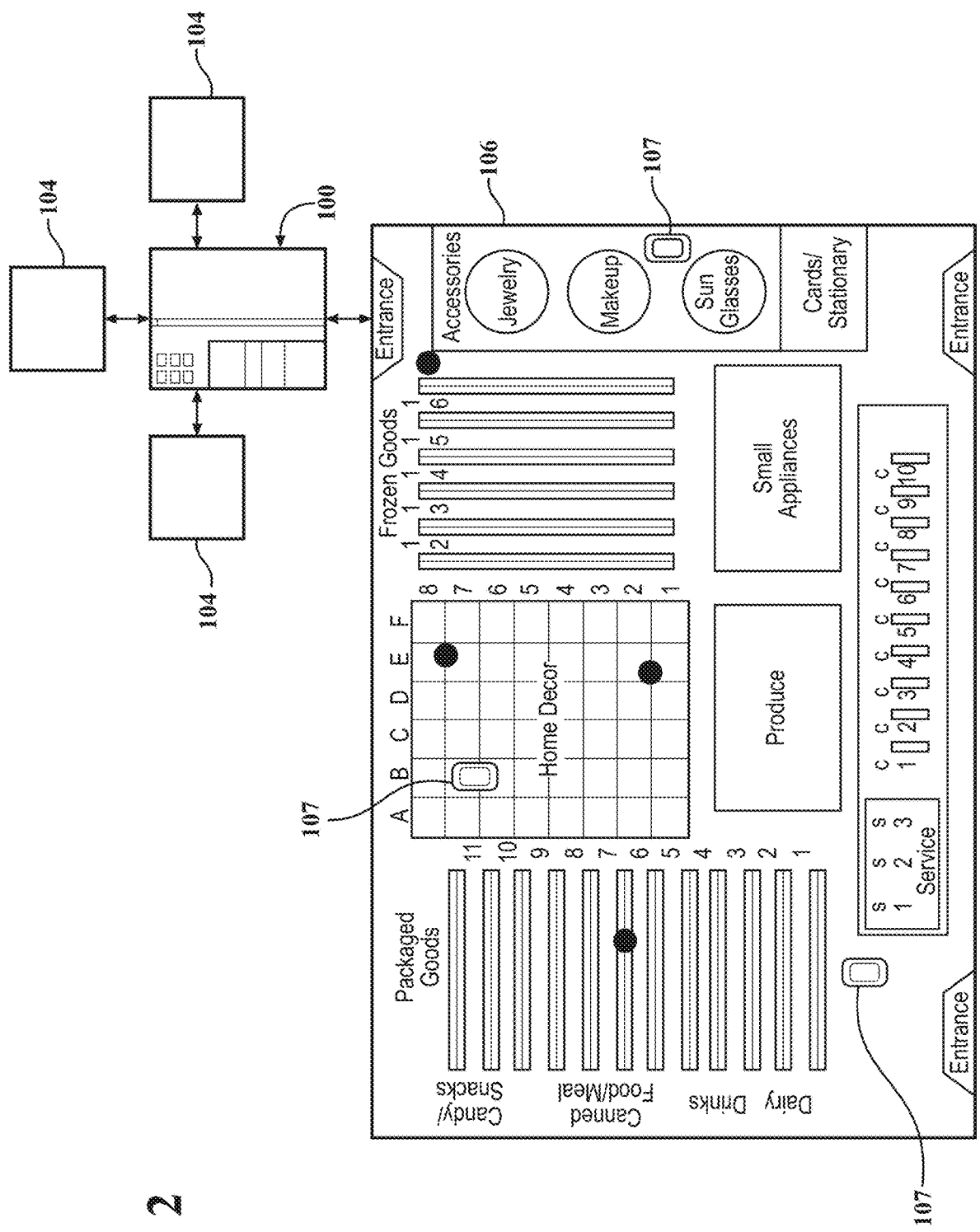
FIG. 2 is another diagrammatic view of the retail store of FIG. 1.

An exemplary retail store 106 is illustrated in FIG. 2 and can be arranged into different departments, such as packaged goods including dairy, drinks, canned foods/meals, and candy/snacks produce; home decor; produce; frozen goods; small appliances; and accessories including jewelry, make-up, sunglasses, and cards/stationary. Each department can be further delineated. For example, the exemplary packaged goods area of the retail store 106 can be subdivided into aisles 1-11 and each aisle can define an "a" side and a "b" side opposite the "a" side. In one embodiment, for each aisle (cluster of modules), there may be bay types and aisle types. The exemplary home decor area can be divided into a grid by letters A-F along a first edge and numbers 1-8 along a second edge perpendicular to the first edge. The illustrated, exemplary retail store 106 can also include one or more entrances, a service counter, and several checkout lines each referenced in FIG. 2 by the letter "c" and a number. It should be appreciated that the arrangement of the retail store 106 is exemplary. It should also be appreciated that, in some embodiments of the present invention, the retail store 106 can be arranged differently and include different departments and/or different products and/or methods for labeling aisles.

The computing device 104 may also store location information corresponding to departments, product categories, product types, etc. The in-store location information may include one or more of, a 3-dimensional coordinate, a 2-dimensional coordinate, department identifier, section identifier, an aisle number, a row number, a display fixture identifier, a display container identifier, shelf height, and the like. In some embodiments, the location information is determined based a planogram of the shopping facility space. It should be appreciated that the location information is stored in a database to be described.

Figure 3:
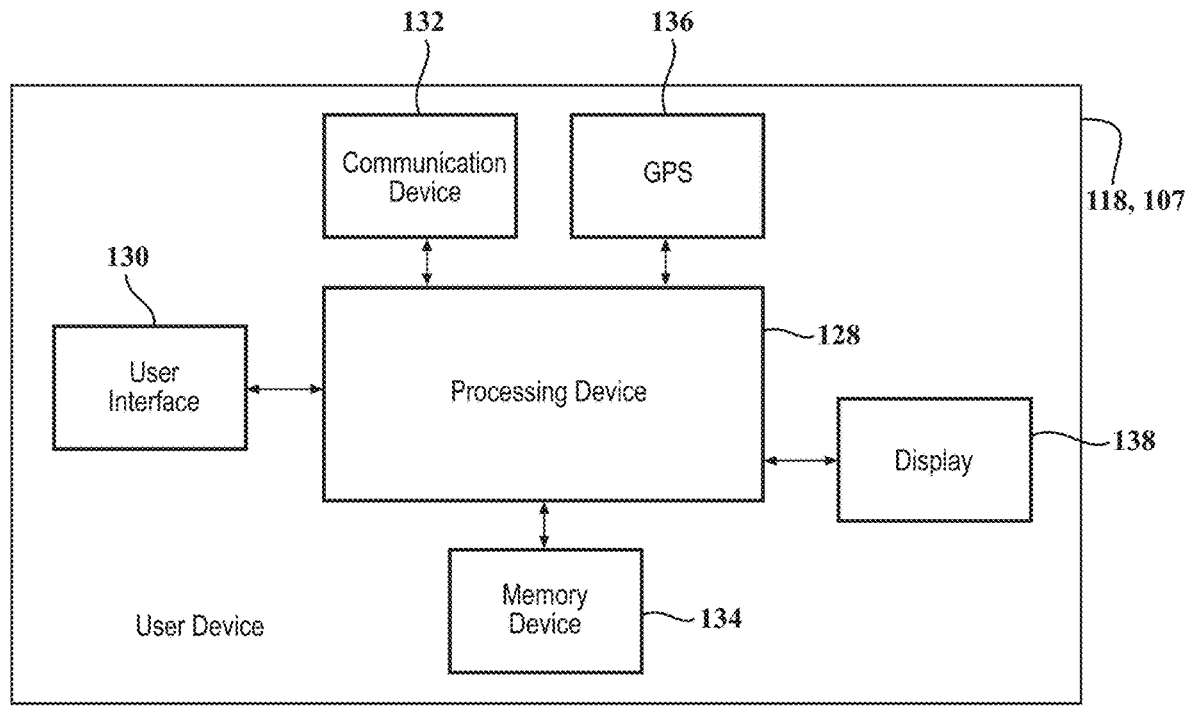
FIG. 3 is a diagrammatic view of a user device used with the system of FIG. 1.

Referring now to FIG. 3, a schematic illustrating example components of one user computing device 107 or user device 118 of FIG. 1 is illustrated. In the illustrative embodiment, the user computing device 107, 118 includes a processing device 128, a user interface 130, a communication device 132, a memory device 134, a global positioning system (GPS) 136, and a display 138. It should be appreciated that the user computing device 107, 118 can include other components and some of the components are not required.

The processing device 128 can include memory, e.g., read only memory (ROM) and random access memory (RAM), storing processor-executable instructions and one or more processors that execute the processor-executable instructions. In embodiments where the processing device 128 includes two or more processors, the processors can operate in a parallel or distributed manner. The processing device 128 can execute the operating system of the user computing device 107, 118.

The user interface 130 is a device that allows a user to interact with the user computing device 107, 118. While one user interface 130 is shown, the term "user interface" can include, but is not limited to, a touch screen, a physical keyboard, a mouse, a microphone, and/or a speaker. The communication device 132 is a device that allows the user computing device 107, 118 to communicate with another device, e.g., the server computing device 104 via the network 120. The communication device 132 can include one or more wireless transceivers for performing wireless communication and/or one or more communication ports for performing wired communication. The memory device 134 is a device that stores data generated or received by the user computing device 107, 118. The memory device 134 can include, but is not limited to, a hard disc drive, an optical disc drive, and/or a flash memory drive.

The GPS 136 is a device that determines a location of the user computing device 107, 118 by communicating with a plurality of GPS satellites. The GPS 136 can perform known triangulation techniques to determine the GPS coordinates of the user computing device 107, 118. It should be appreciated that while a GPS 136 is shown, any other suitable component for determining the location of the user computing device 107, 118 can be implemented.

The display 138 of the user computing device 107, 118 may be a graphical user interface (GUI) that displays information to be described. The GUI further includes a plurality of input objects which allow the user to provide commands to the user computing device 107, 118. In some embodiments, the system 100 may return an item or product waypoint corresponding to an item or product in the retail store 106, each item waypoint indicating a physical location of a specific item in the retail store 106. The display 138 can display the item waypoints to the user via the GUI. In some embodiments, the item waypoints can be displayed in a store map of the retail store 106. In some embodiments, the server computing device 104 can return a map of the retail store 106 and waypoints corresponding to the items or products and map to the user computing device 107. The user computing device 107 can display the store map, such that the waypoints are displayed in the map. It should be appreciated that, in some embodiments, the user interface 130 and the display 138 may be one in the same.

Figure 4:
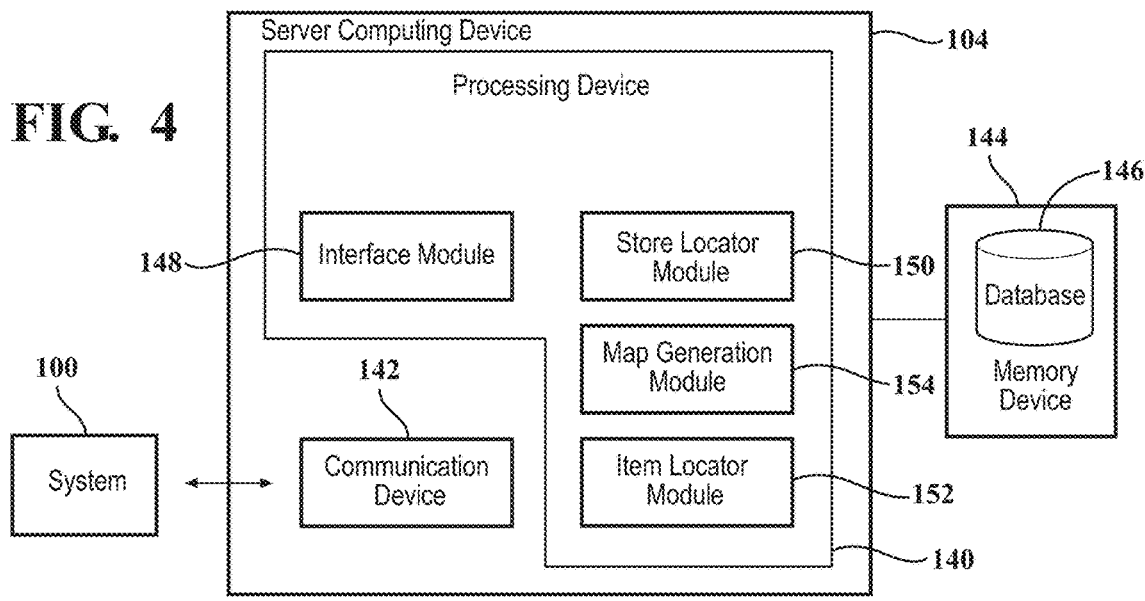
FIG. 4 is a diagrammatic view of one portion of the system of FIG. 1.

Referring to FIG. 4, the server computing device 104 may include a processing device 140, a communication device 142, and memory device 144 having one or more database 146. The processing device 140 can include memory, e.g., read only memory (ROM) and random access memory (RAM), storing processor-executable instructions and one or more processors that execute the processor-executable instructions. In embodiments where the processing device 140 includes two or more processors, the processors can operate in a parallel or distributed manner. In the illustrative embodiment, the processing device 140 executes one or more modules such as an interface module 148, a store locator module 150, an item locator module 152, and a map generation module 154.

The communication device 142 is a device that allows the server computing device 104 to communicate with another device, e.g., the user computing device 107, 118, via the network 120. The communication device 142 can include one or more wireless transceivers for performing wireless communication and/or one or more communication ports for performing wired communication. The communication device 142 is accessible to the processing device 140.

The memory device 144 is a device that stores data generated or received by the server computing device 104. The memory device 144 can include, but is not limited to a hard disc drive, an optical disc drive, and/or a flash memory drive. Further, the memory device 144 may be distributed and located at multiple locations. The memory device 144 is accessible to the processing device 140. In some embodiments, the memory device 144 stores the database 146.

The modules 148, 150, 152, 154 include software and/or hardware modules implementing the methods disclosed herein. In some embodiments, the modules 148, 150, 152, 154 and data of the modules 148, 150, 152, 154 are implemented or accessed by the server computing device 104 or some other entity that provides an interface to the modules 148, 150, 152, 154.

The database 146 may include data for items or products located in the retail store 106. Accordingly, the server computing device 104 may host or access the database 146 of items located in the retail store 106. The database 146 may store a plurality of items or product records. The item records may have one or more brands associated therewith. A brand for an item may represent the manufacturer, seller, importer, or the like for a product and/or a manufacturer of a component part of a product, or other reference to an entity participating in the production and offer for sale of an item or product.

The database 146 may include map data for a map of the retail store 106. Accordingly, the server computing device 104 may host or access the database 146 for a map of the retail store 106. The database 146 may store a plurality of maps for a plurality of retail stores 106. It should be appreciated that each map is produced from a CAD drawing of each retail store 106.

The database 146 stores maps corresponding to different retail locations of the retail stores 106. Each map can be divided into a plurality of regions. A region can describe any type of boundary in the retail location. For instance, in the supermarket setting, a region can refer to a section, e.g., deli or frozen foods, one or more aisles, e.g., aisle, a checkout station, and/or a bank of checkout stations. In some embodiments, the regions may be defined by a collection of geospatial coordinates, e.g., GPS coordinates. Additionally, each map may have metadata associated therewith. Furthermore, for each retail location, the database 146 may store item locations for the items sold at the retail location 106. In one embodiment, the item location may be an XY coordinate in the retail store 106. Each product has an aisle location which has a GPS coordinates or a relative location, e.g., "Brand X Cereal" is located at aisle nine, 50 feet from the front of the aisle. The map is a CAD drawing that is processed into a scalable vector graphic (SVG). It should be appreciated that, when the aisle location of an item is changed to a new aisle, the location inherently changes as well because the aisles are fixed to locations. It should also be appreciated that, as used herein, the term "map" may refer to a digital representation of the layout of the corresponding store location of the retail store 106.

In some embodiments, the database 146 stores item waypoints indicating physical locations of the items sold by the retailer in a particular or specific retail store 106 operated or associated with the retailer. For example, the database 146 may store the location of "milk" in the retail store 106 operated or associated with the retailer.

The database 146 may be configured to store waypoints for specific items and generic items. For example, the database 146 may be configured to store waypoints indicating the location of "ice cream," a generic item, and the location of "Brand X ice cream," a specific item. It should be noted that a waypoint corresponding to a generic item or specific item may be represented using a starting location and ending location. For example, a waypoint corresponding to "ice cream" may indicate where the ice cream section begins and where the "ice cream" section ends. Similarly, a waypoint corresponding to "Brand X ice cream" may indicate where the Brand X's ice cream begins and ends. It should be appreciated that when a specific item is a species of a generic item, e.g., Brand X ice cream is a species of "ice cream," the waypoint corresponding to a specific item may be wholly contained within the waypoint corresponding to the generic item. It should further be appreciated that one system or database links products to aisles and the other system or database links aisles to locations, which are both combined to get locations for items in the aisles.

As discussed, the processing device 144 may execute the store locator module 150. The store locator module 150 receives a location from the user computing device 107 and determines one or more store locations of the retail store 106 corresponding to the received location. In some embodiments, the store locator module 150 queries the database 146 of store locations with the received location and receives the store location of the retail store 106 that correspond to the received location.

The item locator module 152 receives an input of items to be located in the retail store 106 and determines item waypoints corresponding to one or more items or products. In some embodiments, the product locator module 152 queries the database 146 with the items and a store location (which may have been determined by the store locator module 150) and receives item waypoints indicating a location of the items indicated in the retail store 106 corresponding to the store location.

Once the item locator module 152 has determined the various waypoints, e.g., item waypoints, the item locator module 152 may provide the item waypoints to the user computing device 107, such that the user computing device 107 can display the item waypoints. It should be appreciated that the user computing device 107 can display the item waypoints in an electronic store map for the retail store 106.

The map generation module 154 can generate maps for each map stored in the database 146 or can generate a map upon receiving a request for a map for a particular location of the retail store 106 from a requesting device, e.g., a user computing device 107. For purposes of explanation, the description of the map generation module 154 assumes that the maps are generated in response to a request for a map for a particular location of the retail store 106. It should be appreciated that the techniques described herein can be modified to generate maps for all of the retail locations in the database 146 at defined intervals, e.g., every 15 minutes.

The map generation module 154 can receive a request to generate a map for a particular retail location. In response to the request, the map generation module 154 retrieves a map corresponding to the particular retail location from the database 146. Furthermore, the map generation module 154 can receive inputs for each region of the retail location from the system 100. For example, the map generation module 154 can receive inputs indicating (L, R, P) from the system 100, where L is the retail store location, R is a region of the retail location, and P is a product in the region R. The map generation module 154 receives these inputs for each of the regions in the particular retail location. It should be appreciated that the map generation module 154 only knows the aisle locations for the items and nothing about the items themselves.

In some embodiments, the map generation module 154 may be further configured to obtain a map corresponding to the location of the retail store 106. The map generation module 154 can obtain the map from the database 146. In some of these embodiments, the map generation module 154 can provide the map and the item waypoints to the user computing device 107. In other embodiments, the map generation module 154 can render the map with one or more waypoints displayed therein. In these embodiments, the map generation module 154 may use the locations indicated by the various waypoints to determine locations in the map where the graphical icons should be displayed. The map generation module 154 can then insert the graphical icons at the determined locations. The map generation module 154 can provide the rendered image to the user computing device 107.

The system 100 links the server computing device 104 to transmit and provide a physical location of the items in the retail store 106. The store map is overlaid with icons or waypoints on the display 138 of the user computing device 107. The store map represents the retail store 106 and the waypoints for the items are positioned overlaid on the store map to designate a physical location of the items in the retail store 106. It should be appreciated that the store map is a full-screen map and the items are displayed or in an item/product information section on the store map such that a waypoint and pick path for each item will appear on the store map.

Figure 5:
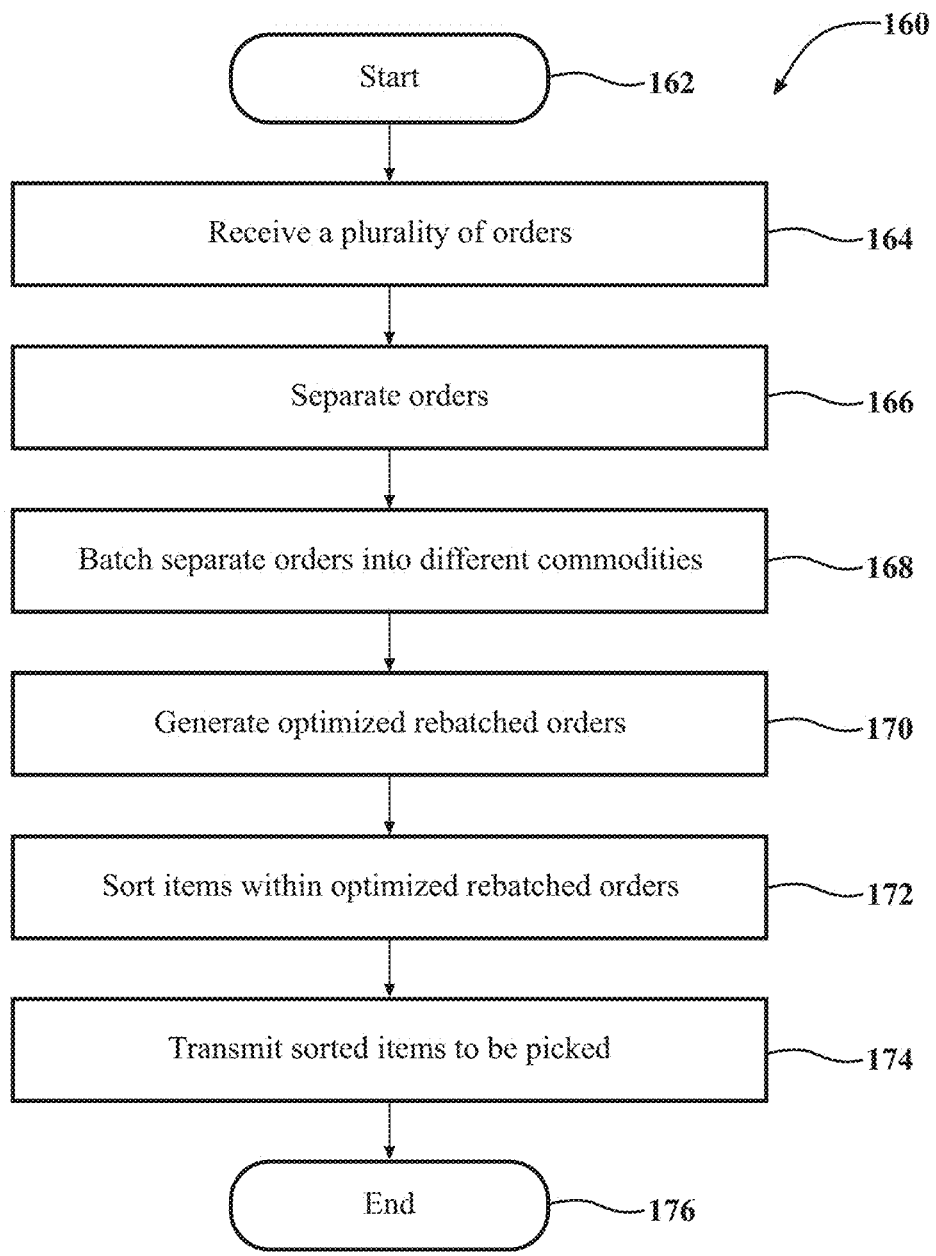
FIG. 5 is a flowchart of a method, according to one embodiment of the present invention, of using the system of FIGS. 1 through 4.

Referring to FIG. 5, a method, according to the present invention, for improving in-store picking performance and experience by optimizing tote-fill and order batching of items in the retail store 106 is disclosed. The method optimizes on two fronts simultaneously, first on minimizing the distance traveled by the picker to pick the items, and second maximizing the tote-fill for picking items in the retail store 106. An example method 160, according to one embodiment of the present invention, using the system 100 is illustrated. The method 160 can be executed by the components illustrated in FIGS. 1 through 4. In general, a flowchart of the method 160, according to one embodiment of the present invention, starts in bubble 162. The method 160 includes the steps of receiving a plurality of orders having one or more items from customers 112 in block 164. For example, receiving, by the server computing device 104 or the system 100, a plurality of orders to be fulfilled in the retail store 106. For example, all orders placed by a predetermined time period such as 12:00 a.m. are dropped into the global integrated fulfillment queue 122 from an order schedule provided by the computing device 104 to be picked by a predetermined time period such as 9:00 a.m. Further, the global integrated fulfillment queue 122 delivers the orders to a picking system of the retail store 106 at 4:00 a.m. It should be appreciated that the orders for the one or more items are transmitted by the customers 112 from their user devices 118. It should also be appreciated that an average online grocery order contains 50-60 different items.

The method 160 also includes the step of separating the orders received in block 166. For example, separating, by the computing device 104 or system 100, the orders by load number and due times. For example, the orders are separated by the computing device 104 or system 100 into load numbers (e.g., delivery truck numbers), which correspond to weight and due times, which, in turn, corresponds to a delivery or in-store pick-up times. The method 160 includes the steps of batching separate orders into different commodities in block 168. For example, batching, by the computing device 104 or the system 100, the separate orders into different commodities. For example, the separate orders are batched by the computing device 104 or system 100 into different commodities such as chilled, frozen, ambient, milk, meat, can goods, etc. The method includes the steps of generating optimized rebatched orders based on at least one of distance and volume of the items of the one or more items within the batched orders of the different commodities in block 170. For example, generating, by the computing device 104 or the system 100, the optimized rebatched orders based on at least one of distance and volume of the items of the one or more items within the batched orders of the different commodities. The method includes the steps of sorting the one or more items within the rebatched orders by sequence numbers in block 172. For example, sorting, by the computing device 104 or the system 100, the one or more items based on their sequence numbers such as to 1, 2, 5, 6. The method includes the steps of transmitting the order of the sorted one or more items to the computing device 107 of the picker in the retail store 106 in block 174. For example, transmitting, by the computing device 104 or the system 100, the sorted one or more items to the computing device 107 to be picked and filled in totes in the retail store 106. The picker then picks the sorted items and fills the totes in the trolley. For example, the picker uses a trolley which contains eight (8) totes of fixed volume to pick the order. The method ends in block 176. It should be appreciated that, if every tote is utilized to the fullest, the number of items picked in single pick-walk can be maximized. It should also be appreciated that the method includes other steps such as providing the computer system and servers and coupling the servers to one another.

Figure 6:
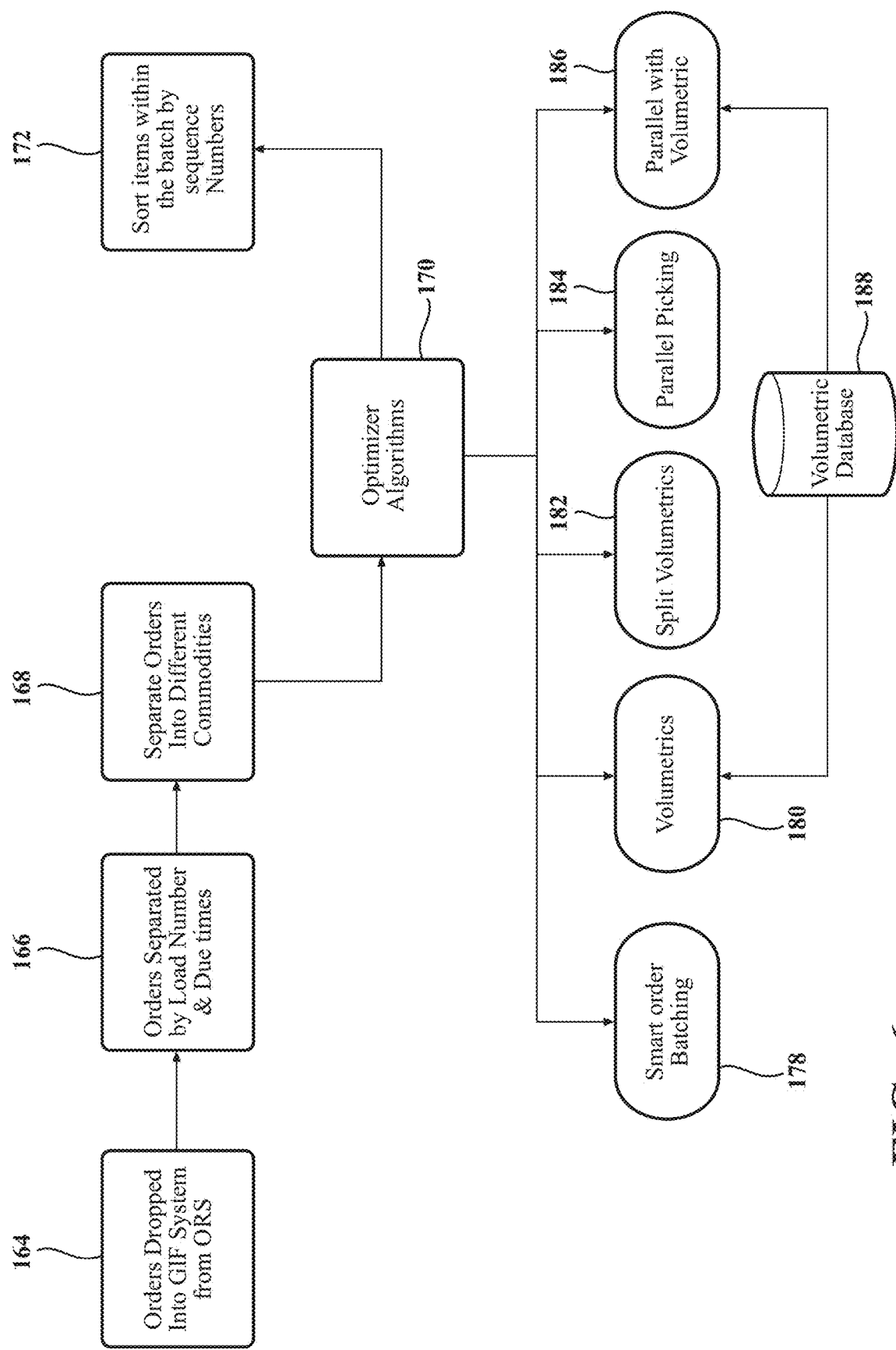
FIG. 6 is a diagrammatic view of the flowchart of FIG. 5.

Referring to FIG. 6, a diagrammatic view of block 170 of FIG. 5 is shown. In block 170, an optimization algorithm rebatches the orders of different commodities. For example, the optimization algorithm may rebatch the orders of different commodities based on smart order batching in block 178, volumetrics in block 180, split volumetrics in block 182, parallel picking in block 184, or parallel picking with volumetrics in block 186. In one embodiment, the smart order batching in block 178 is based on items which are closer to each other in distance are batched together ensuring better pick-walk. In another embodiment, volumetrics in block 180 is based on the volume of the items to fill in the totes are batched together. For block 180, the method interacts with a volumetric database 188, which may be one of the databases 146, to retrieve volume data on items. Based on the volume of the items and the volume of the tote, items are batched together to fill the tote. In yet another embodiment, split volumetrics in block 182 is based on items across aisles in the retail store 106 are batched together to improve rates. In still another embodiment, parallel picking in block 184 is based on items in the same aisles in the retail store 106 are batched together to improve rates. In a further embodiment, the parallel picking with volumetrics in block 186 is based on both the volume of the items to fill the totes and the items being in the same aisles. The optimization algorithm can reside in the system 100 between the in-store picking system and an order management system to optimize static order batching. It should be appreciated that the optimization algorithm assists in optimizing static order batching, which is based on the assumption that all customer orders are known in advance. It should also be appreciated that blocks 178-186 are variants of the optimization algorithm of block 170.

To reduce picking costs and improve fulfillment velocity, the method primarily targets the following main aspects of picking:

Maximizing tote fill—An average online grocery order contains 50-60 different items.

The picker uses a trolley which contains eight (8) totes of fixed volume to pick the order. If every tote is utilized to the fullest, the number of items picked in single pick-walk can be maximized.

Hence, every order $O_n = \{I_1, I_2 \ldots I_n\}$ can be represented as $O_n = \{T_1, T_2 \ldots T_n\}$ where, $T_1 \cup T_2 \cup \ldots T_n = O_n$ and $T_i \cap T_j = \emptyset, \forall T_i, T_j \in O_n$ It should be appreciated that I represents an item and T represents a tote. So, part of the solution deals with finding disjoint sets $T_i$s so that $\Sigma_{I \in T} V_i \leq C$ ($V_i$ is the volume of $I_i$ item and C is total tote volume) and $\Sigma_{I \in T} C - V_i$ is minimized.

Reducing pick-walk—Because of the capacity constraint of the trolley (for 8 totes/trolley), a picker can pick limited totes per pick-walk.

If the pick-walk P is represented as follows:

$P = \{T_1, T_2 \ldots T_N\} N \leq K$, where $K$ is total capacity of trolley;

Define Item-set I P corresponding to P such that $I \in$ P if $I \in T_i$ for all $T_i \in$ P;

C(P)—Cost of picking every Item $I \in P$+cost of loading totes to backroom area;

Hence, the problem reduces to finding a set sol=$\{P_1, P_2 \ldots P_n\}$ such that $\Sigma_{P \in sol}C(P)$ is minimized.

Pseudo Code

---
Algorithm 1 Picking Optimizer 1:
---
```
1:  procedure orderBatching(orderList)
2:      splitOrderListSet = orderSplit(orderList)
3:      for splitOrderList ∈ splitOrderListSet do
4:          solutionHeap.add(batchingOptimiser(splitOrderList))
5:      while not converged or finite steps do
6:          splitOrderListSet = getNextGeneration(splitOrderListSet,
            solutionHeap)
7:
8:      for splitOrderList ∈ splitOrderListSet do
9:          solutionHeap.add(batchingOptimiser(splitOrderList))
```

---
Algorithm 2 Next Generation
---
```
1:  procedure getNextGeneration(splitOrderListSet, solutionHeap)
2:      for i^th solution ∈ solutionHeap such that i ≤ x do
3:          newSet.add(mutate(splitOrderList corresponding to solution x))
4:      for ith solution ∈ solutionHeap such that i ≤ x do
5:          newSet.add(crossover(splitOrderLists corresponding to solution
            i, j))
6:      return newSet.
```

It should be appreciated that the method can be executed by the components illustrated in FIGS. 1 through 4. It should be appreciated that the output is a pick list to the computing device 107 of the picker in the retail store 106. It should also be appreciated that the method includes other steps such as providing the computer system and servers and coupling the servers to one another.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A system comprising:
a server computing device comprising one or more processors, the server computing device being configured to provide output to a plurality of first user devices of a plurality of first users, wherein the plurality of first users comprise workers at a plurality of retail stores, the server computing device being further configured to communicate with the plurality of first user devices and a plurality of second user devices and to perform:
receiving, using an item locator system of the server computing device, a plurality of orders having one or more items, wherein the plurality of orders are received from the plurality of second user devices of a plurality of customers, and wherein the plurality of orders are associated with the plurality of retail stores;
separating, by the one or more processors of the server computing device, the plurality of orders by a plurality of vehicle load numbers, wherein each vehicle load number of the plurality of the vehicle load numbers is associated with a weight and a due time;
batching, by the one or more processors of the server computing device, the plurality of orders, as separated, into different commodities, wherein the different commodities comprise different temperatures of the one or more items;
generating, by the one or more processors of the server computing device, rebatched orders according to an optimization algorithm that generates the rebatched orders based at least in part on both a distance and a first volume of each respective item of the one or more items within each of the rebatched orders of the different commodities;
sorting, by the one or more processors of the server computing device, the one or more items within the rebatched orders by sequence numbers based on at least a second volume of a container of each respective one of a number of containers to be used by the plurality of first users to retrieve the one or more items of each of the rebatched orders; and
sending instructions, by the one or more processors of the server computing device, to display on user interfaces of the plurality of first user devices information for filling the each respective one of the number of containers with the one or more items of each of the rebatched orders.

2. The system of claim 1, wherein the server computing device is further configured to perform:
defining a pick-walk P as a function of total capacity of a trolley as:

$P=\{T_1, T_2 \ldots T_n\} N \leq K$, where each T represents a respective trolley used by a respective one of the plurality of first users to fill the number of containers, N represents a number of the one or more items, and K is a total capacity of the trolley used.

3. The system of claim 1, wherein the server computing device is further configured to perform:
defining an item-set I P corresponding to a pick-walk P as:

$I \in P$ if $I \in T_i$ for all $T_i \in P$, where I represents an item of the one or more items, and T represents a trolley used by one of the plurality of first users to fill the number of containers.

4. The system of claim 1, wherein the server computing device is further configured to perform:
storing, in a database of the server computing device, map data of the one or more items located in a retail store of the plurality of retail stores associated with a map of the retail store, wherein the database further stores a plurality of maps for the plurality of retail stores.

5. The system of claim 1, wherein the server computing device is further configured to perform:
defining every order $O_n \{I_1, I_2 \ldots I_n\}$ as:

$O_n = \{T_1, T_2 \ldots T_n\}$ where, $T_1 \cup T_2 \cup \ldots T_n = O_n$ and $T_i \cap T_j = \emptyset, \forall T_i, T_j \in O_n$, where $O_n$ represents a respective one of the plurality of orders, each T represents a respective trolley used by a respective one of the plurality of first users to fill the number of containers, and each I represents a respective item of the one or more items.

6. The system of claim 1, wherein the server computing device is further configured to perform:
finding disjoint sets $T_i$s so that $\Sigma V_i \leq C$ is minimized, wherein, $T_i$s represents disjoint sets, $V_i$ is a volume of $I_1$, $I_1$ represents an item of the one or more items, and C is a total second volume of the container.

7. The system of claim 1, wherein the optimization algorithm is based on smart order batching.

8. The system of claim 1, wherein the optimization algorithm is based on either one of volumetrics or split volumetrics.

9. The system of claim 1, the optimization algorithm is based on either one of parallel picking or parallel picking with volumetrics.

10. A method comprising:
providing, by a server computing device comprising one or more processors, output to a plurality of first user devices of a plurality of first users, wherein the plurality of first users comprise workers at a plurality of retail stores, and wherein the server computing device being configured to communicate with the plurality of first user devices and a plurality of second user devices;
receiving, by an item locator system of the server computing device, a plurality of orders having one or more items, wherein the plurality of orders are received from the plurality of second user devices of a plurality of customers, and wherein the plurality of orders are associated with the plurality of retail stores;
separating, by the one or more processors of the server computing device, the plurality of orders by a plurality of vehicle load numbers, wherein each vehicle load number of the plurality of the vehicle load numbers is associated with a weight and a due time;
batching, by the one or more processors of the server computing device, the plurality of orders, as separated, into different commodities, wherein the different commodities comprise different temperatures of the one or more items;
generating, by the one or more processors of the server computing device, rebatched orders according to an optimization algorithm that generates the rebatched orders based at least in part on both a distance and a first volume of each respective item of the one or more items within each of the rebatched orders of the different commodities;
sorting, by the one or more processors of the server computing device, the one or more items within the rebatched orders by sequence numbers based on at least a second volume of a container of each respective one of a number of containers to be used by the plurality of first users to retrieve the one or more items of each of the rebatched orders; and
sending instructions, by the one or more processors of the server computing device, to display on user interfaces of the plurality of first user devices information for filling the each respective one of the number of containers with the one or more items of each of the rebatched orders.

11. The method of claim 10, further comprising:
defining a pick-walk P as a function of total capacity of a trolley as:

$$P=\{T_1, T_2 \ldots T_n\} N \leq K,$$

where each T represents a respective trolley used by a respective one of the plurality of first users to fill the number of containers, N represents a number of the one or more items, and K is a total capacity of the trolley used.

12. The method of claim 10, further comprising:
defining an item-set I P corresponding to a pick-walk P as:

$$I \in IP \text{ if } I \in T_i \text{ for all } T_i \in P,$$

where I represents an item of the one or more items, and T represents a trolley used by one of the plurality of first users to fill the number of containers.

13. The method of claim 10, further comprising:
storing, in a database of the server computing device, map data of the one or more items located in a retail store of the plurality of retail stores associated with a map of the retail store, wherein the database further stores a plurality of maps for the plurality of retail stores.

14. The method of claim 10, further comprising:
finding a set sol=$\{P_1, P_2 \ldots P_n\}$ such that $\Sigma_{p \in sol} C(P)$ is minimized.

15. The method of claim 13, further comprising:
defining every order $O_n \ldots \{I_1, I_2 \ldots I_n\}$ as:

$$O_n=\{T_1, T_2, \ldots T_n\} \text{ where, } T_1 \cup T_2 \cup \ldots T_n=O_n \text{ and } T_i \cap T_j=\emptyset, \forall T_i, T_j \in O_n,$$

where $O_n$ represents a respective one of the plurality of orders, each T represents a respective trolley used by a respective one of the plurality of first users to fill the number of containers, and each I represents a respective item of the one or more items.

16. The method of claim 10, further comprising:
finding disjoint sets $T_i$s so that $\Sigma_{i \in T} V_i \leq C$ is minimized, wherein, $T_i$s represents disjoint sets, $V_i$ is a volume of $I_1$, $I_1$ represents an item of the one or more items, and C is a total second volume of the container.

17. The method of claim 10, wherein the optimization algorithm is based on smart order batching.

18. The method of claim 10, wherein the optimization algorithm is based on either one of volumetrics or split volumetrics.

19. The method of claim 10, wherein the optimization algorithm is based on either one of parallel picking or parallel picking with volumetrics.

20. One or more non-transitory computer-readable storage media, having computer-executable instructions embodied thereon, wherein when executed by at least one processor, the computer-executable instructions cause the processor to:
provide output to a plurality of first user devices of a plurality of first users, wherein the plurality of first users comprise workers at a plurality of retail stores, and wherein a server computing device being configured to communicate with the plurality of first user devices and a plurality of second user devices;
receive a plurality of orders having one or more items, wherein the plurality of orders are received from the plurality of second user devices of a plurality of customers, and wherein the plurality of orders are associated with the plurality of retail stores;
separate the plurality of orders by a plurality of vehicle load numbers, wherein each vehicle load number of the plurality of the vehicle load numbers is associated with a weight and a due time;
batch the plurality of orders, as separated, into different commodities, wherein the different commodities comprise different temperatures of the one or more items;
generate rebatched orders according to an optimization algorithm that generates the rebatched orders based at least in part on both a distance and a first volume of each respective item of the one or more items within each of the rebatched orders of the different commodities;
sort the one or more items within the rebatched orders by sequence numbers based on at least a second volume of a container of each respective one of a number of containers to be used by the plurality of first users to retrieve the one or more items of each of the rebatched orders; and sending instructions to display on user interfaces of the plurality of first user devices information for filling the each respective one of the number of containers with the one or more items of each of the rebatched orders.

\* \* \* \* \*